US007894162B2

(12) United States Patent
Mahdev et al.

(10) Patent No.: US 7,894,162 B2
(45) Date of Patent: Feb. 22, 2011

(54) METHOD TO PROTECT THE MAGNETIC RECORDING HEAD FROM THERMAL ASPERITIES DURING DISK DRIVE OPERATION

(75) Inventors: Niraj Mahdev, Milpitas, CA (US); Kasumaza Yasuda, Sunnyvale, CA (US); Ellis Cha, San Ramon, CA (US)

(73) Assignee: SAE Magnetics (HK) Ltd., Shatin, N.T. (HK)

( * ) Notice: Subject to any disclaimer, the term of this patent is extended or adjusted under 35 U.S.C. 154(b) by 968 days.

(21) Appl. No.: 11/787,329

(22) Filed: Apr. 16, 2007

(65) Prior Publication Data

US 2008/0253026 A1   Oct. 16, 2008

(51) Int. Cl.
*G11B 5/60* (2006.01)
*G11B 21/20* (2006.01)
*B24B 1/00* (2006.01)

(52) U.S. Cl. .................. 360/236.5; 360/235.7; 451/36; 451/41; 29/603.12

(58) Field of Classification Search .................. 451/5, 451/28, 36, 41; 29/603.12, 603.15, 603.16; 360/236.5, 235.7
See application file for complete search history.

(56) References Cited

U.S. PATENT DOCUMENTS

| 5,768,055 | A | 6/1998 | Tian et al. |
| 6,117,499 | A | 9/2000 | Wong et al. |
| 6,131,271 | A | 10/2000 | Fontana, Jr. et al. |
| 6,233,118 | B1 | 5/2001 | Boutaghou et al. |
| 6,243,234 | B1 | 6/2001 | Haddock et al. |
| 6,312,316 | B1 | 11/2001 | Takahashi et al. |
| 6,359,754 | B1 | 3/2002 | Riddering et al. |
| 6,361,420 | B1 | 3/2002 | Zuniga et al. |
| 6,377,422 | B1 | 4/2002 | Boutaghou et al. |
| 6,556,389 | B1 | 4/2003 | Boutaghou et al. |
| 6,679,760 | B2* | 1/2004 | Fukuroi et al. ............ 451/41 |
| 6,722,962 | B1 | 4/2004 | Sato et al. |
| 6,728,069 | B2 | 4/2004 | Otsuka et al. |
| 6,741,524 | B2 | 5/2004 | Ichihara et al. |
| 6,891,699 | B2 | 5/2005 | Kameyama et al. |
| 6,903,901 | B2 | 6/2005 | Kasamatsu et al. |
| 6,934,101 | B2* | 8/2005 | Fong et al. ............ 360/31 |
| 7,455,332 | B2* | 11/2008 | Jose et al. ............ 29/603.16 |
| 2002/0119734 | A1* | 8/2002 | Fukuroi et al. ............ 451/41 |
| 2004/0264020 | A1* | 12/2004 | Fong et al. ............ 360/25 |
| 2007/0109686 | A1* | 5/2007 | Jose et al. ............ 360/235.1 |
| 2008/0055781 | A1* | 3/2008 | Arun et al. ............ 360/240 |

OTHER PUBLICATIONS

Co-pending U.S. Appl. No. 11/378,100, filed Mar. 16, 2006, "Method and Apparatus for Producing Micro-Texture on a Slider Substrate Using Chemical & Mechanical Polishing Techniques", assigned to the same assignee as the present invention.

* cited by examiner

*Primary Examiner*—William J Klimowicz
(74) *Attorney, Agent, or Firm*—Saile Ackerman LLC; Stephen B. Ackerman

(57) ABSTRACT

A slider mounted read/write head is protected from thermal asperities due to head-disk interactions by a ridge formed along an interfacial plane that extends above the ABS plane of the slider. The ridge is formed as part of a lapping process that is directed from the read/write head towards the slider substrate and uses an abrasive slurry to which may be added a strong base such as KOH. The height of the ridge is less than approximately 2 nm.

8 Claims, 4 Drawing Sheets

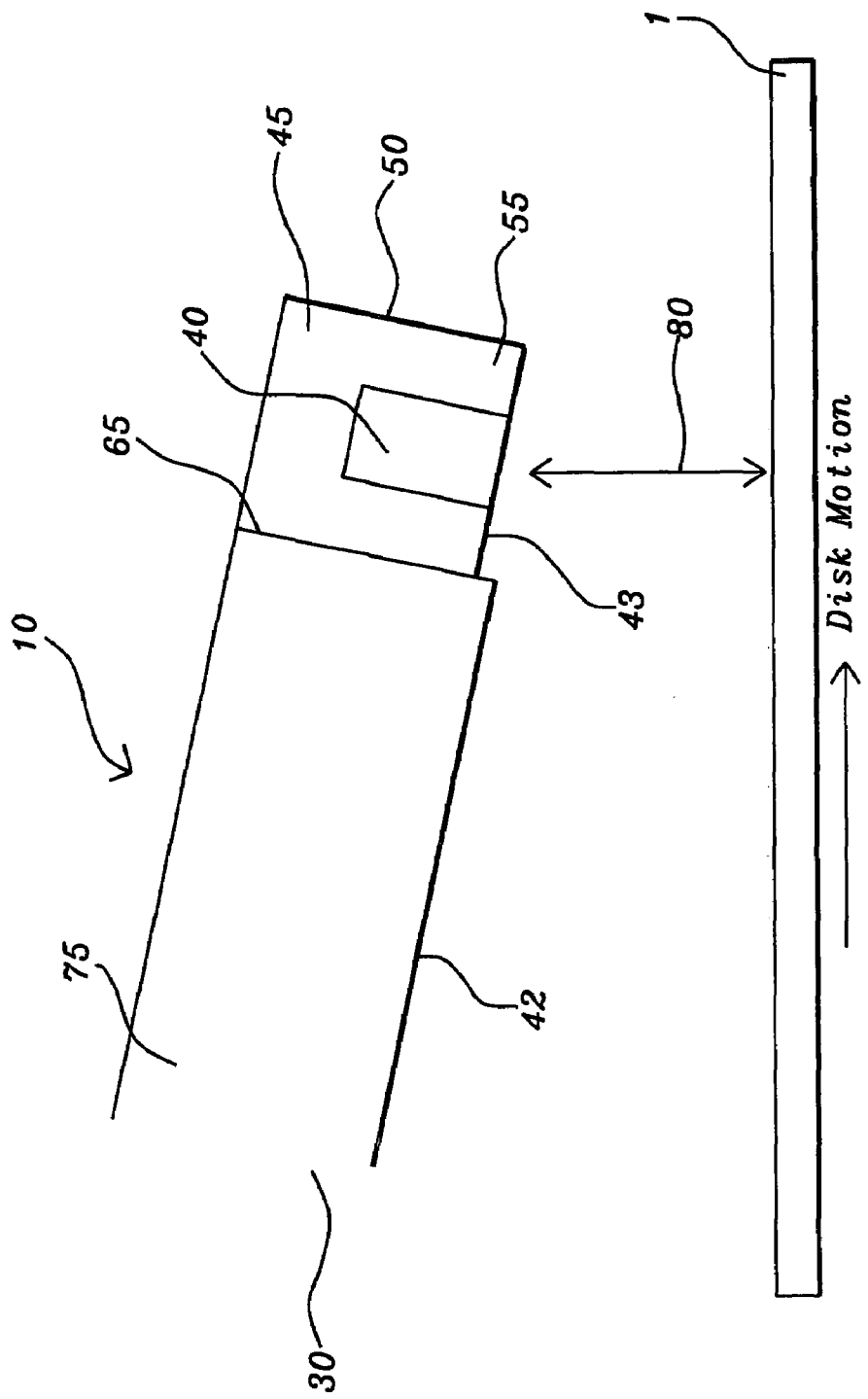
FIG. 1 – Prior Art

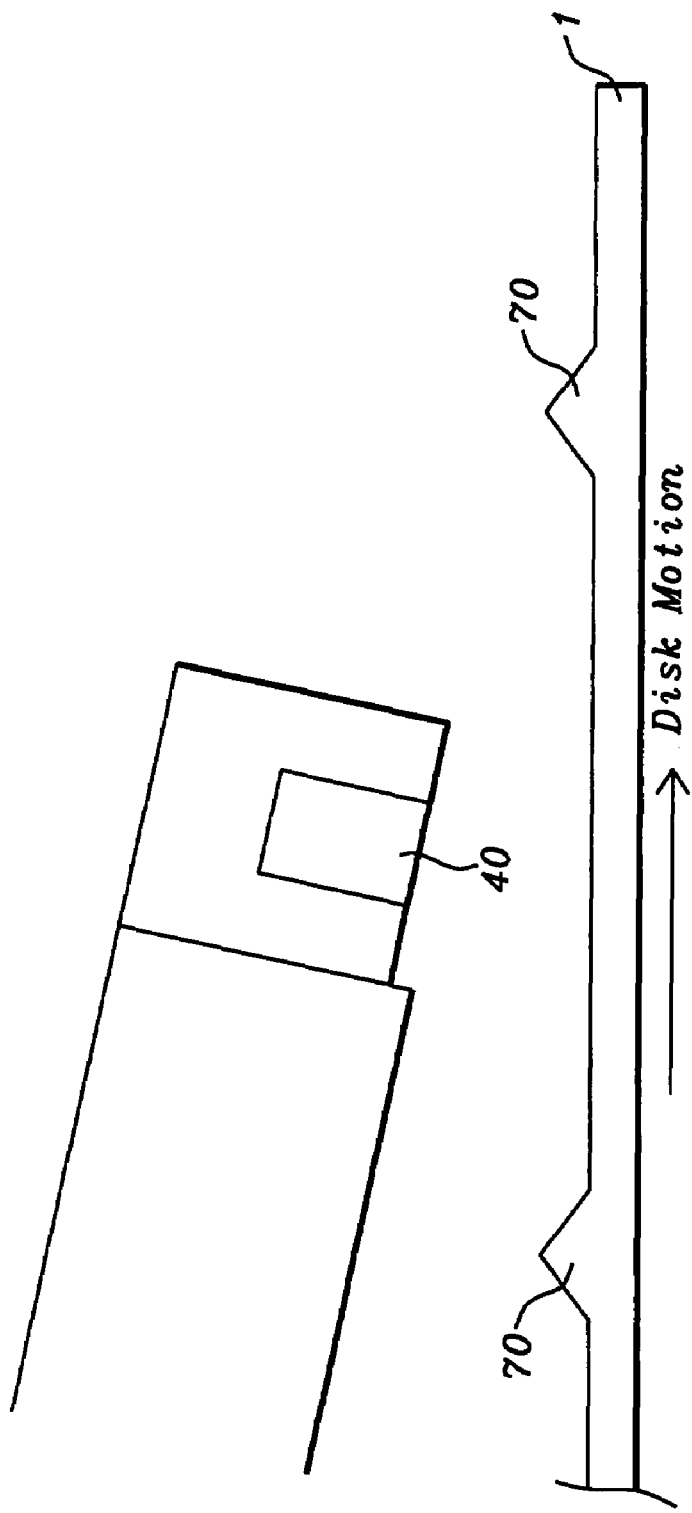
FIG. 2 – Prior Art

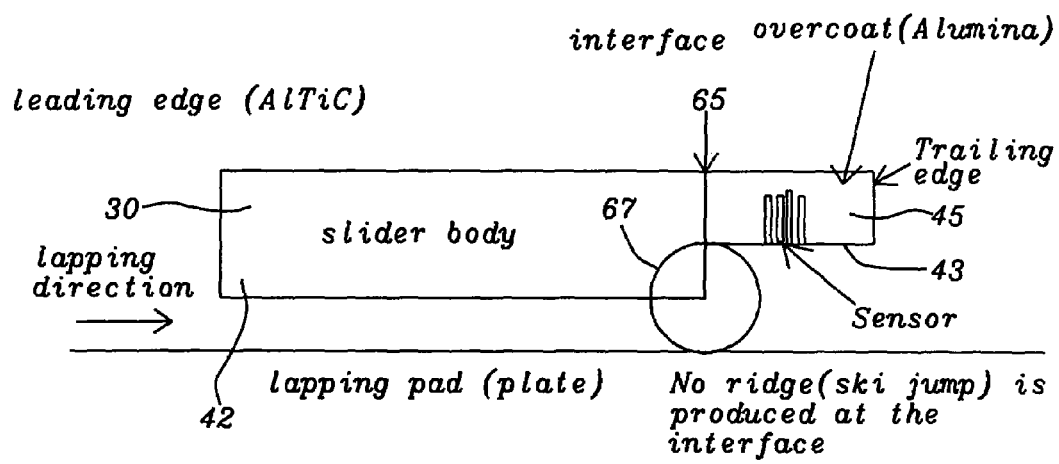
FIG. 3 - Prior Art
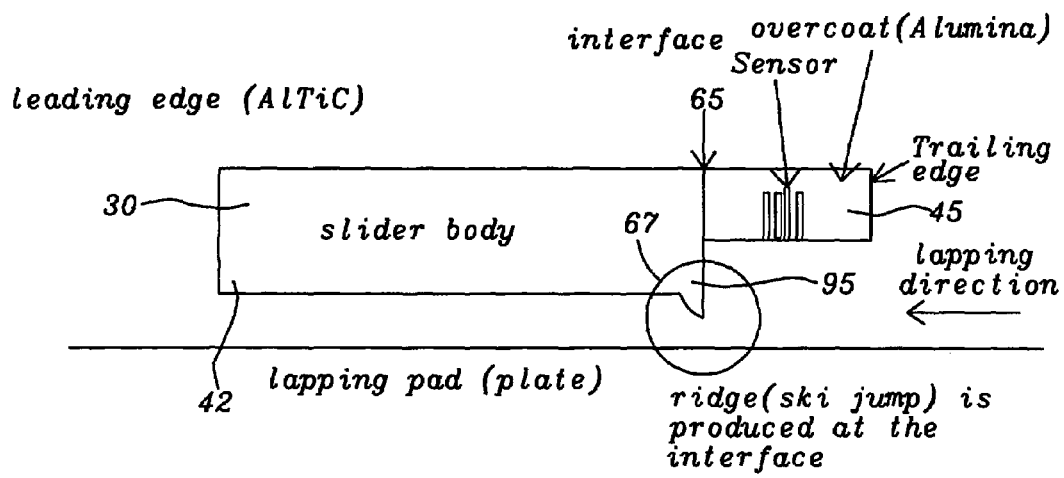
FIG. 4

METHOD TO PROTECT THE MAGNETIC RECORDING HEAD FROM THERMAL ASPERITIES DURING DISK DRIVE OPERATION

BACKGROUND OF THE INVENTION

1. Field of the Invention

This invention relates to the fabrication of thin film magnetic read/write heads and particularly to a method for forming a slider surface so that the read/write head is less subject to thermal asperities due to near contact with a magnetic disk.

2. Description of the Related Art

As shown in FIG. 1, a hard disk drive (HDD) uses an encapsulated, small thin film magnetic read/write head (40), formed on a ceramic substrate (75) to read and write data on a magnetic medium or storage disk (1). The read/write head is formed using well known semiconductor deposition techniques such as electroplating, CVD (chemical vapor deposition) and photolithographic patterning and etching. The entire structure of head plus substrate is called a slider (10). FIG. 1 is a schematic illustration of such a device as is used in the prior art and whose performance improvement is the object of the present invention. The slider (10) has a pre-patterned air-bearing surface (ABS) (42), (43) that faces the rotating disk (1) during HDD operation. The slider is mounted on the distal end of a head gimbal assembly (HGA) (not shown) that is activated by an electro-mechanical mechanism and control circuitry to position the head at various positions along the magnetic tracks on the disk (not shown).

As the disk is rapidly rotated by a spindle motor (not shown), hydrodynamic pressure causes an air flow between the ABS of the slider and the surface of the disk. This flow lifts the slider so that it literally flies above the surface of the disk (at a "fly height") on a layer of air. The spacing between the head and the disk surface at this position is referred to as the magnetic spacing (80). The edge of the slider into which the disk rotates (indicated by an arrow) is called its "leading edge (30)," the opposite edge, which contains the read/write head (40), is called the "trailing edge (50)."The read/write elements (40) are encapsulated within the read/write head portion (45) of the slider. The head portion (45) is formed on the slider substrate (75) at an interfacial plane (65). The slider substrate has an ABS plane (42) and the read/write head has an ABS plane (43). These two planes are parallel but the read/write head ABS plane is slightly lower than the substrate ABS plane as shown in the figure. The aerodynamics of the slider motion lifts the leading edge higher above the rotating disk surface than the trailing edge.

The slider substrate (75), is composed of hard AlTiC. Sputtered $Al_2O_3$ (alumina), formed to a thickness of approximately 0.035 mm, forms a nearly transparent insulating coating (55) on the ABS surface and encapsulates the read and write sensors (40) which are located at the trailing edge of the slider. We will note again the interfacial plane (65) between the AlTiC of the substrate body (75) and the sputtered alumina (55) that covers the read/write head components.

There are many factors, both internal and external to the drive that can directly or indirectly affect the magnetic spacing during HDD operation. For example, if the drive is subjected to an external shock, the shock can be transmitted to the head causing a modulation in the magnetic spacing. Such a modulation can progress to a head-disk contact, damaging the head or disk or both and, if severe enough, causing a failure of the drive. Other reasons for variations in the magnetic spacing are such internal problems as variation in disk smoothness, surface contamination, stiction, or high-altitude drive operation.

Another major problem that results from magnetic spacing variations during disk drive operation is thermal "asperities," variations in read head operation that result from its deviations from thermal equilibrium. The read transducer portion of the read/write head is typically made up of a magnetoresistive (MR) element that is encapsulated in exotic materials. When the read head comes into contact with any mechanical asperity on the disk (e.g. a surface irregularity, dirt, an accumulation of lubricant, etc.), a resulting development of frictional resistance will produce a signal spike of approximately 1-3 microsecond duration, in the MR read element which will inhibit its reading capabilities. FIG. 2 is a schematic side view of the slider mounted read/write head (40) flying above a rotating disk (1), the arrow indicating the motion of the disk surface towards the read/write head. Two exemplary "bumps" (70) on the disk would undoubtedly cause sufficient head-disk interaction to create an undesirable thermal asperity.

Even some of the next generation technologies, such as dynamic write excitation during the write operation of the disk drive, create a head-disk contact problem. By exciting the writer, we intentionally cause the transducer to protrude, reducing the magnetic spacing and thus increasing the chance of head-disk contact. The problem becomes even more of a concern in perpendicular magnetic recording (PMR), where the writer structure includes a much larger volume of material.

Much research and effort has been invested in both head development and disk development to address the problem of head-disk contact. Improvements ranging from smooth disks to textured media, coupled with micro-texturing of the slider surface and new and complex designs of the air-bearing surface (ABS) of the heads have helped to alleviate the problem to a large extent. However, both head and media manufacturers recognize the need for continual improvement in this area and that recognition is has led to a conscious effort to discover methods of achieving that goal.

Numerous approaches have been taken in the prior art to address the problem of head-disk interactions. Haddock et al. (U.S. Pat. No. 6,243,234 B1) propose an approach that recesses the entire transducer area within the slider. While this certainly addresses the problem, the amount of recession suggested, approximately 40 nm, is very large and will reduce the efficiency of the head. Also, this type of solution requires very tight process control in creating the recession, and such process control is a constant challenge in manufacturing. Another potential problem associated with this approach is due to the nature of the hardness variations of the writer and reader materials, which would cause localized profile variations that would adversely affect the head operation.

Another approach is taught by Boutaghou et al. (U.S. Pat. No. 6,556,389 B1), which is to recess the entire transducer area much below the substrate and to cover it with a thick, insulative covering. This coating, together with the slider, is then coated yet again with another wear resistant coating, such as a diamond-like carbon (DLC) coating to supply double protection. This does help to reduce the effects caused by a head-disk contact, but it requires a multiplicity of complicated process steps and, therefore, lowers the manufacturing efficiency. Boutaghou also proposes an alternative approach in U.S. Pat. No. 6,233,118 B1, where a debris-collecting feature is engraved in front of the transducers, to prevent or reduce the thermal asperities due to head-disk contact. All of these ideas suggest the necessity of additional process steps to build protective features into the head, thereby increasing the cost of manufacturing.

Tian et al. (U.S. Pat. No. 5,768,055) attacks the problem in an innovative fashion, by placing the protective DLC coating onto the slider body in the form of an array so as to potentially reduce the probability of thermal asperities caused by a head-disk contact. This placement and design of this array must be carefully and accurately calculated, depending upon the fly height characteristics of the head. This approach, therefore, also warrants additional processing steps and masks which, in turn, increase manufacturing costs.

Riddering et al. (U.S. Pat. No. 6,359,754 B1) suggests depositing the protective coating on the head in a way that avoids the actual transducer element. This causes an offset that, in turn, creates a step-like difference in surface height between the transducer and the slider body, thereby providing additional protection to the head during an event. This approach runs the risk of allowing metallic elements in the transducers to corrode, since they lack the necessary protection of a coating. With the next generation of metals being considered for use in head fabrication, the potential for corrosion is even increased.

Another interesting approach to reducing thermal asperities due to head-disk contact is physically building patterns and features in front of transducers. This approach, in various forms, is the subject of inventions by Kameyama et al. (U.S. Pat. No. 6,891,699 B2), Kasamatsu et al. (U.S. Pat. No. 6,903, 901 B2) and Otsuka et al., (U.S. Pat. No. 6,728,069 B2). All of these inventions require additional process steps which raise the manufacturing cost of the slider. For example, U.S. Pat. No. 6,903,901 teaches processes such as reactive ion etch (RIE), ion milling and photolithography to produce protective elements on both the leading and trailing edges of the slider surface.

The present invention attacks the asperity problem by using a CMP polishing method previously developed by the inventors and described in their application entitled: "Method And Apparatus For Producing Micro-Texture On A Slider Substrate Using Chemical & Mechanical Polishing Techniques," Ser. No. 11/378,100, now U.S. Pat. No. 7,513,820 B2, Filing Date Mar. 16, 2006, which is fully incorporated herein by reference. This method, which will be applied in a novel manner described fully below, uses the lapping process by which the ABS of the slider is polished to create a protective ridge that will eliminate thermal asperities caused by head-disk interactions.

The initial step in slider fabrication is the slicing of a wafer on which is formed a plurality of slider mounted read/write heads into pre-patterned blocks or "quads," (quadrants) which are then further sliced into individual rows containing a horizontal array of slider mounted read/write heads. After this cutting is completed, the ABS of the row is polished by lapping to obtain critical dimensional control of the read and write elements as well as for the improvement of the surface finish. Polishing is typically accomplished by applying an abrasive slurry to the surface being polished. Such slurries are well known in the prior art and several exemplary patents are noted herein as being representative of the slurry compound and the method of its application. For example, Sato et al. (U.S. Pat. No. 6,722,962, Zuniga et al. (U.S. Pat. No. 6,312, 316), Takahashi et al. (U.S. Pat. No. 6,312,316) and Fontana, Jr., et al. (U.S. Pat. No. 6,131,271) all teach CMP slurries containing colloidal silica and KOH. Wong et al. (U.S. Pat. No. 6,117,499 discloses a method for texturing a magnetic disk surface by the use of a combination of laser application and KOH slurry CMP.

Based on the above discussion of prior art, it would be extremely advantageous to develop an efficient, easy-to-implement (within present manufacturing processes) and inexpensive method of protecting a slider mounted read/write head from the problem of thermal asperities produced by head-disk interactions. The method taught in the present invention has distinct advantages over the prior art cited above and achieves the desired goal. The objects of the present method and the means of achieving those objects will now be presented.

SUMMARY OF THE INVENTION

The first object of the present invention is to provide a method of fabricating a slider mounted read/write head that is resistant to thermal asperities caused by head-disk interactions.

A second object of the present invention is to provide such a method that is efficient, easy to implement within present manufacturing practices and inexpensive.

A third object of the present invention is to provide such a method that easily interfaces with present process steps and does not require more stringent attention to manufacturing tolerances.

A fourth object of this invention is to provide such a method that does not require the use of additional or foreign materials or structures.

These objects are all achieved by a CMP (chemical mechanical process) lapping of the slider using a chemical slurry enhanced by the addition of chemicals such as KOH or other strong basic compounds. The lapping process creates a microtexture on the slider body by selectively etching the alumina over the titanium carbide. As a result of the lapping process a single ridge of uniform height and consistent shape is formed on the ABS of the slider at the line of its intersection with the interfacial plane between the AlTiC portion of the slider substrate and the alumina-encapsulated read/write head. The shape and location of this ridge is such that it will protect the read/write head from thermal asperities caused by head-disk interactions during HDD operation. Since this ridge performs a similar task as analogous structures formed by other prior art methods, yet since it does not require the formation of such additional structures or the introduction of foreign materials or additional or new process steps as do the other prior art methods, it is believed that this is a highly, efficient and cost-effective method.

Referring to FIG. 3, there is shown a schematic side view of our previous lapping process, in which the lapping direction (arrow) was from the leading edge (30) of the slider (the AlTiC body) towards the trailing edge (covered with the sputtered alumina ($Al_2O_3$) (45)). The slight step (67) (circled) is shown (exaggerated) between the ABS plane of the slider (42) and the surface plane of the sensor (43) along the AlTiC/$Al_2O_3$ interfacial plane (65). By lapping in the direction shown, no step height variation relative to the slider ABS plane (within the circled region (67)) is observed at the AlTiC/$Al_2O_3$ interfacial plane (65).

Referring to FIG. 4, there is shown a schematic illustration of the process of the present invention in which the lapping direction (arrow) is towards the trailing edge (the sputtered alumina (45)) of the slider and away from the leading edge (30). By reversing the direction of the lapping so that it proceeds from trailing edge to leading edge as shown, a ridge (95) is formed within the circled region (67) along the line of intersection of the interfacial plane (65) and the ABS plane of the substrate (42). The ridge has the shape of a ski-jump, for lack of a better term. As can be seen in FIG. 3, no such ridge is formed in our prior process.

Referring now to FIG. 5, there is shown a graphical illustration of nine exemplary trials on groups of sliders that measure the ridge heights and the standard deviations of these heights that have been produced using the method of this invention. It is seen that the ridge heights are less than approximately 1 nm, with standard deviations of approximately 0.5 nm. These ridges are consistently produced by the lapping procedure.

Referring to FIG. 6, there is shown evidence of the consistent shape of the ridges that are produced by the method of this invention. This figure, which is exemplary, shows, encircled, the shape of a ridge (approx. 1.8 nm ridge height) produced by a preferred embodiment of the lapping process that adds KOH, in a percentage of approximately 1% to an abrasive slurry of colloidal silica (see below for a more precise composition of the slurry). The shape has been measured along approximately a track center line of the slider surface using atomic force microscopy and displays a smooth profile in a vertical direction, where the term "vertical" refers herein to a displacement perpendicular to the ABS plane of the slider. As already noted, the shape of the ridge approximates (from right to left of the graph) a ski-jump.

The X-axis of the figure is the distance along the slider body and is measured in microns. The graph is typically showing approximately 60 microns of length of measurement. The Y-axis is showing the vertical height of the surface features in nm above the slider air bearing surface plane. The height range of the ordinate is approximately −10 nm to +10 nm. There are three solid black arrows in the measurement showing (from right to left) the ski-jump (which is on the edge of the AlTiC body and is circled), the reader (arrow to the left of the ski-jump) and the writer (arrow to the left of the reader), if measured from left to right of the picture. The "vertical distance" (ordinate) printed on the AFM scan tells you the height or depth of the feature being measured. For example, this particular ski-jump feature shows a height of approximately 1.894 nm. Both the reader and writer "vertical distance" in this case are measured to be approximately 3 nm below a nominal zero, which is approximately the air bearing surface plane.

BRIEF DESCRIPTION OF THE DRAWINGS

The objects, features, and advantages of the present invention are understood within the context of the Description of the Preferred Embodiment as set forth below. The Description of the Preferred Embodiment is understood within the context of the accompanying figures, wherein:

FIG. 1 is a schematic side-view drawing showing a slider of the type to be processed by the present invention.

FIG. 2 is a schematic side-view drawing showing a slider flying above a disk having surface irregularities.

FIG. 3 is a schematic side-view showing a previous (prior-art) method of lapping a slider FIG. 4 is a schematic side-view showing the lapping process of the present invention.

DESCRIPTION OF THE PREFERRED EMBODIMENTS

Figure 5:
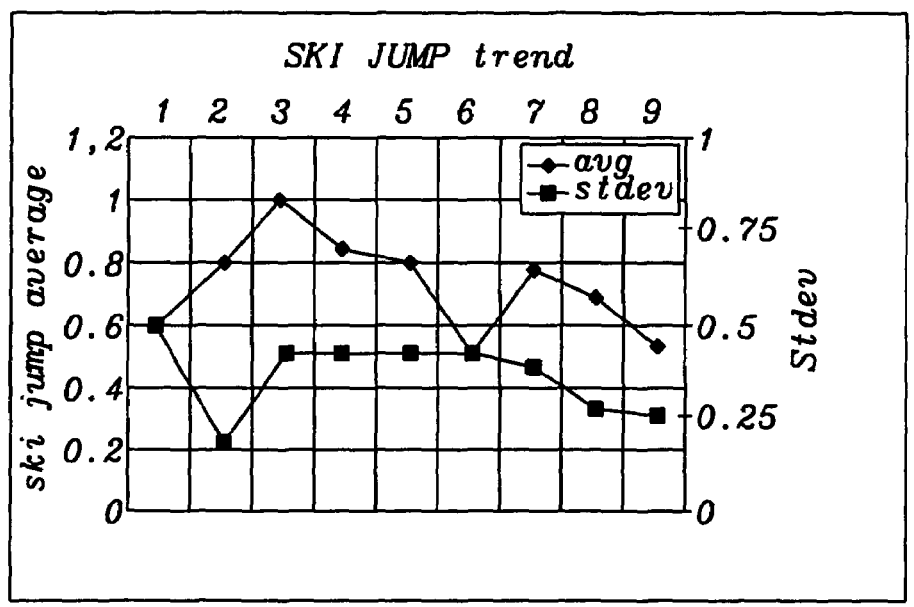
FIG. 5 is a graph indicating the average size and standard deviation of ridges produced by the present invention.

The preferred embodiment of the present invention teaches a method of chemical/mechanical (CMP) polishing the ABS of a slider, using a colloidal silica slurry or a silica slurry enhanced by the addition of KOH or other strong bases, so that a ridge is produced on the ABS plane of the slider substrate at its line of intersection with the interfacial plane between the slider body and the read/write head. For a given slurry composition, the ridge has a consistent height and shape and serves to protect the read/write head from thermal asperities during HDD operation.

Referring again to FIG. 4, as was discussed above, this figure schematically represents the results of the present invention. A lapping process uses an abrasive slurry of colloidal silica to which is added an amount of KOH. The lapping is applied in the direction from the trailing edge of the read/write head (45), towards the leading edge of the slider substrate (30). The result is a smooth ski jump shaped ridge (95) (circled) of a height that is typically less than approximately 2 nm and has been shown to be less than approximately 1 nm in selected tests. The ridge is formed on the line of intersection between the interfacial plane (65) and the ABS plane of the substrate (42). This ridge will protect the read/write head from head-disk interactions that will cause thermal asperities in its operation.

The mechanism to achieve this ridge feature depends on the direction of lapping. One hypothesis for this phenomenon is that during lapping from trailing to leading edges the abrasives in the slurry tend to gather at the interface and when a critical pressure is achieved in the build up, the abrasives suddenly pour out to the AlTiC portion of the slider body thus leaving behind the small ridge at the interface. We also believe that the interface is depleted of the abrasives which, in turn, results in negligible cutting rates which also contributes to the formation of the ridge. Added to the fact that we are lapping from a softer alumina body towards a harder AlTiC body there will be a differential in the wear rates at any instant of time. The harder body will always lap less than the softer body thus leaving behind a ridge formation at their interface. When we lapped in the reverse direction, we did not observe a ridge formation. Finally, there could be other factors contributing directly or indirectly to the ridge formation, such as the distribution of TiC grains in the substrate itself. If a large concentration of grains do occur just at the interface between the sputtered alumina coating and the underlayer, the nature of the lapping process will not allow the interface area to be textured enough as compared to other portions of the slider substrate, thus resulting in a ridge formation at the interface.

Figure 6:
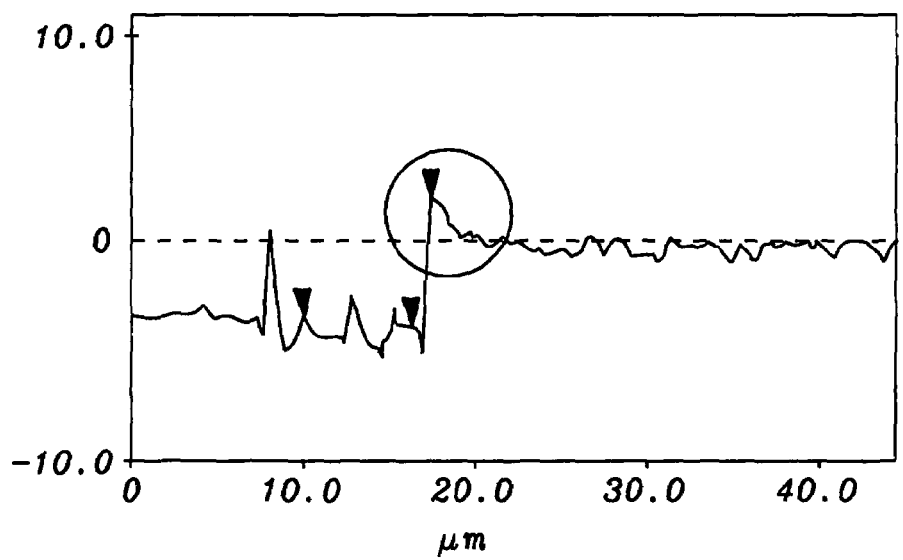
FIG. 6 is a graphical representation of the shape of the ridges (measured by atomic force microscopy) produced by an embodiment of the present invention when KOH is added to the slurry.

By adding chemicals such as KOH or other strong bases to the slurry we can enhance the slurry's chemical action thus enabling the ridge formation to be accelerated with the same lapping parameters as produce the result shown in FIG. 6. In the laboratory we have shown that an optimum combination of abrasive slurry and basic chemical additive can produce a ridge formation with a height of less than approximately 2 nanometers. A preferred slurry composition to achieve the objects of the invention includes approximately 10 cc of KOH in a chemical solution that consists of 20 parts of DI water to 1 part of colloidal silica by volume.

As is understood by a person skilled in the art, the preferred embodiment of the present invention is illustrative of the present invention rather than being limiting of the present invention. Revisions and modifications may be made to methods, processes, materials, structures, and dimensions through which is formed a slider mounted read/write head with a ridge formation that eliminates thermal asperities due to head-disk interactions during hard disk drive operation, while still providing such a slider mounted read/write head, formed in accord with the present invention as defined by the appended claims.

What is claimed is:

1. A method of forming a slider-mounted read/write head that does not exhibit thermal asperities due to head-disk interactions during hard disk drive operation comprising:
   providing the slider-mounted read/write head, said slider-mounted read/write head having an interfacial plane between a slider substrate and a read/write head portion and said substrate having a substrate ABS plane that is perpendicular to said interfacial plane and said read/write portion having a read/write head portion ABS plane that is parallel to and vertically below said substrate ABS plane; then
   lapping said substrate ABS plane and said read/write head portion ABS plane of said slider-mounted read/write head in a direction from said read/write head towards said substrate ABS plane, whereby said lapping produces a ridge at a line of intersection between said substrate ABS plane and said interfacial plane, said ridge extending above said substrate ABS plane and said ridge having a smooth vertical profile.

2. The method of claim 1 wherein said slider substrate is formed of AlTiC and said read/write head is encapsulated in sputtered alumina.

3. The method of claim 1 wherein said lapping uses an abrasive slurry.

4. The method of claim 3 wherein said abrasive slurry is mixed with a strong base.

5. The method of claim 4 wherein said abrasive slurry is a colloidal silica slurry.

6. The method of claim 5 wherein said abrasive slurry comprises approximately 10 cc of KOH in a chemical solution that consists of 20 parts of DI water to 1 part of colloidal silica by volume.

7. The method of claim 6 wherein the extension of said ridge above the substrate ABS plane can be controlled by adjusting the percentage of KOH, with a greater extension corresponding to a greater percentage.

8. The method of claim 1 wherein said ridge extends above said substrate ABS plane by less than approximately 2 nm.

* * * * *